May 10, 1955
W. W. CUSHMAN
2,708,046
INDUSTRIAL LIFT-TRUCK
Filed Nov. 25, 1952
2 Sheets-Sheet 1
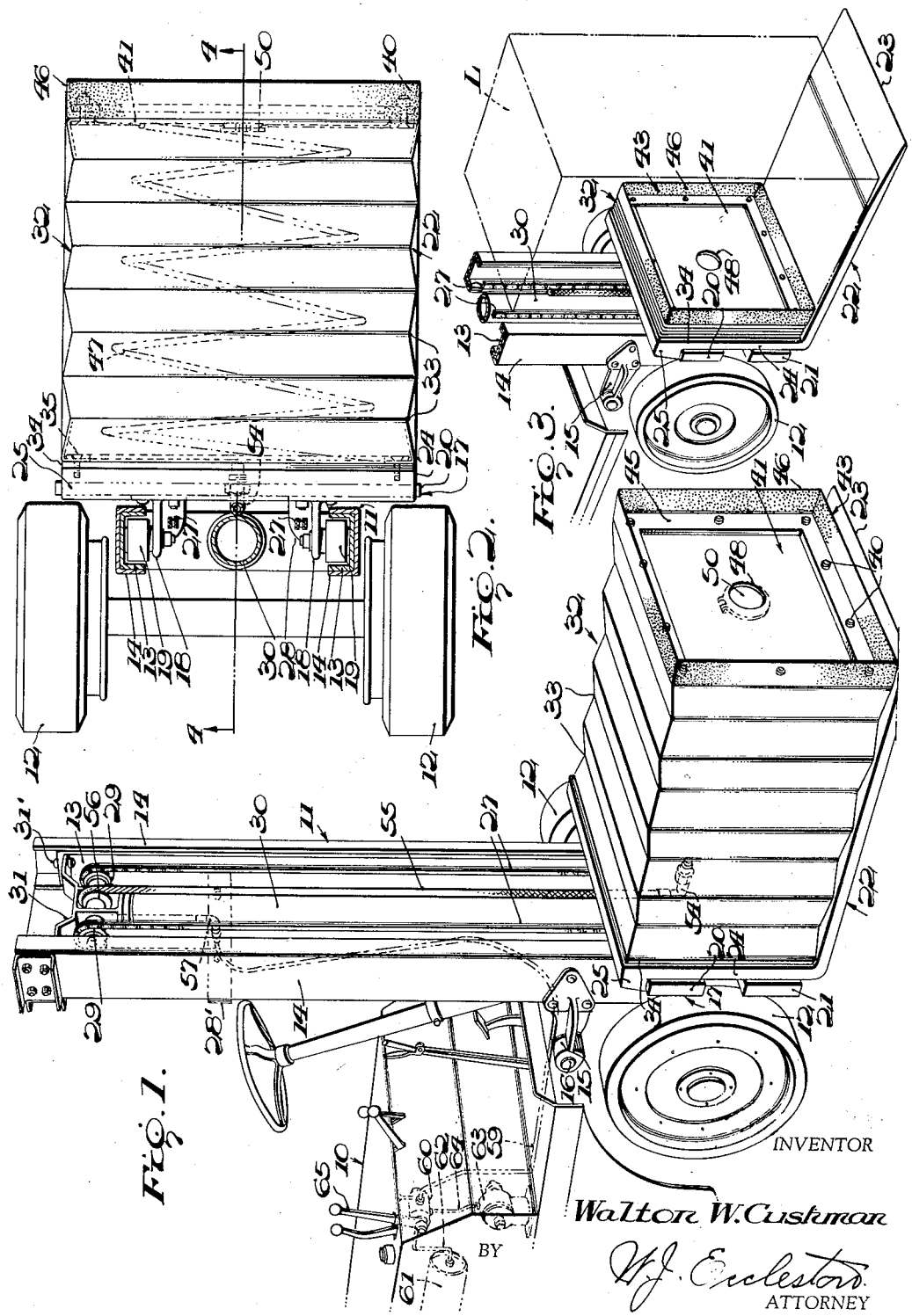
INVENTOR
Walter W. Cushman
BY
W. J. Eccleston
ATTORNEY

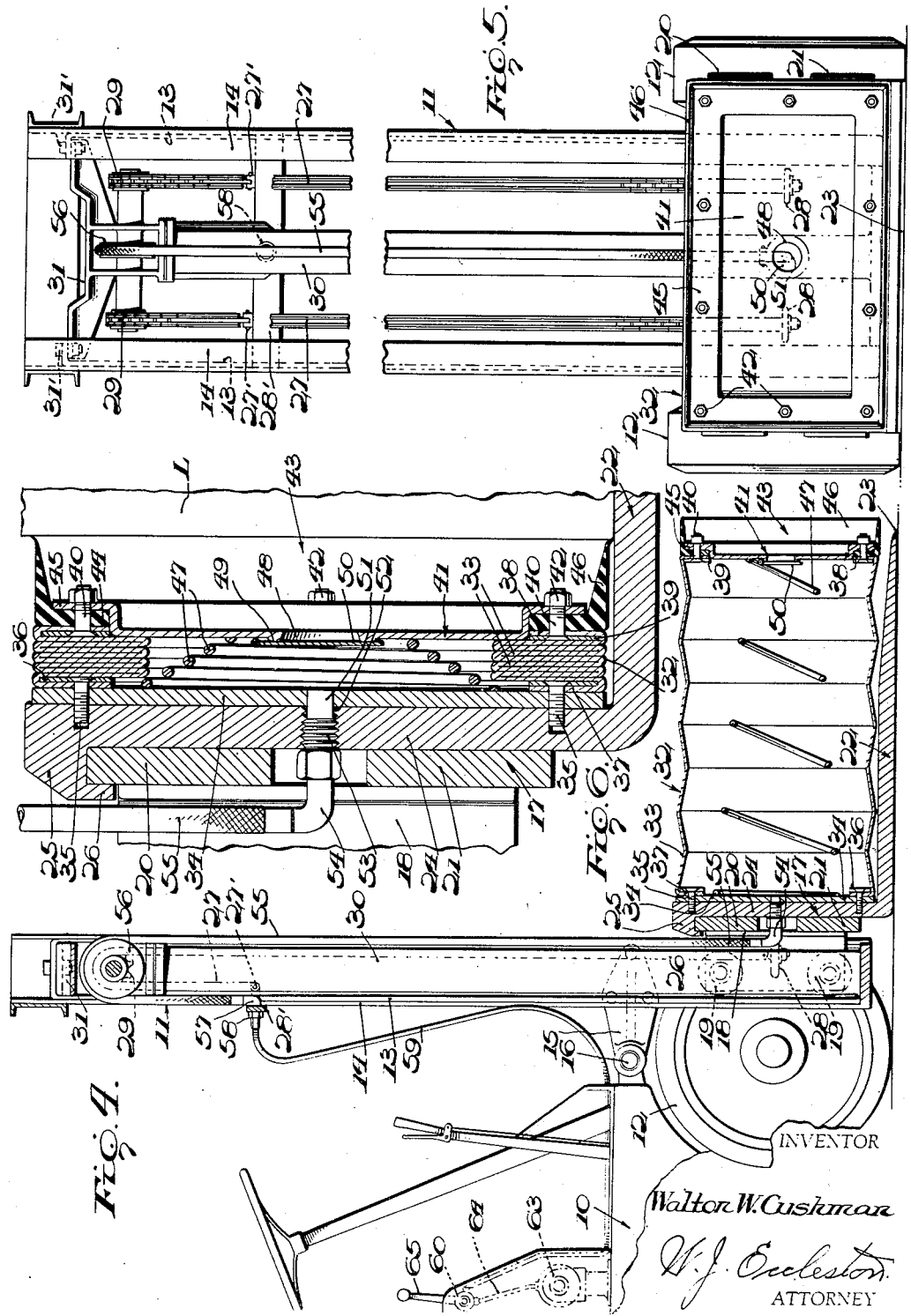

United States Patent Office

2,708,046
Patented May 10, 1955

2,708,046

INDUSTRIAL LIFT-TRUCK

Walton W. Cushman, Webb City, Mo.

Application November 25, 1952, Serial No. 322,591

7 Claims. (Cl. 214—514)

(Granted under Title 35, U. S. Code (1952), sec. 266)

The invention described herein, if patented, may be manufactured and used by or for the Government for governmental purposes, without the payment to me of any royalty thereon.

The present invention relates to industrial lift-trucks, and more specifically to loading and unloading means for lift-trucks.

A primary object of the invention is to provide means controlled by the operator of an industrial lift-truck for drawing a load onto and pushing or discharging the load from the carrier plate or load-supporting platform of the truck.

A further object is to provide loading and unloading means for industrial lift-trucks which are pneumatically operated.

A further object is to provide means operated by suction for drawing the load onto the lifting platform or forks of the industrial truck, and by pressure for pushing the load off of the lifting platform.

A further object is to provide loading and unloading means for industrial trucks of the above-mentioned character which are compact and simplified in construction and which will not detract from the general utility of the truck.

A still further object is to provide loading and unloading means for industrial lift-trucks which will effect a considerable saving of labor and time in the handling of loads which are not palletized.

Other objects and advantages of the invention will be apparent during the course of the following description.

In the accompanying drawings, forming a part of this application, and in which like numerals are employed to designate like parts throughout the same, Figure 1 is a fragmentary perspective view of an industrial lift-truck having the loading and unloading means embodying the present invention, Figure 2 is a plan view of the same, Figure 3 is a fragmentary perspective view on a reduced scale, similar to Figure 1 and showing the position of the loading and unloading means after a load has been drawn onto the lifting element of the truck, Figure 4 is a central vertical section taken substantially on line 4—4 of Figure 2, parts in elevation, Figure 5 is a front elevation of the lift-truck, and Figure 6 is an enlarged fragmentary central vertical longitudinal section through the loading and unloading means of the truck and showing the same in the retracted position when the load has been drawn onto the truck.

In the drawings, where for the purpose of illustration is shown a preferred embodiment of the invention, the numeral 10 designates generally an industrial lift-truck of generally conventional construction, and provided at its forward end with the usual upright tiltable frame or mast structure 11, arranged between the front wheels 12 of the truck. The mast 11 embodies the usual inner and outer sets of telescoping channels or guides 13 and 14, the outer channels 14 having support bearings 15 rigidly secured thereto near and above the front wheels 12, and pivotally mounted upon trunnions 16, in turn rigidly secured to the body portion of the truck 10.

The usual load-lifting carriage 17 is provided for movement longitudinally of the mast 11, and this carriage may comprise a pair of laterally spaced upright members or bars 18, arranged inwardly of the sides of the mast 11 and having pairs of rollers 19 journaled thereon and disposed inside of the innermost channels 13 of the mast for rolling engagement therein. The carriage 17 further comprises upper and lower vertically spaced transverse bars or plates 20 and 21, arranged slightly forwardly of the front wheels 12, and rigidly secured to the vertical members 18, by bolting or the like. The construction thus far described is that of a substantially conventional industrial lift-truck, to which the pneumatic loading and unloading means to be described hereinafter are applied.

The vertically movable carriage 17 preferably carries a single wide substantially flat carrier plate or platform 22 having its leading end tapering gradually to a thin knife-like leading edge 23. The lower surface of the carrier plate 22 is flat and horizontal, for engagement upon a flat floor or the like when the carriage 17 is fully lowered. The carrier plate 22 includes a rear vertical plate extension 24, integral therewith, and arranged at right angles thereto. The top of the plate extension 24 carries a rearwardly projecting extension or head 25, integral therewith and having a short depending flange or lip 26 integrally secured to its rear side for engagement over the upper longitudinal edge of the upper plate 20 of the carriage 17. The carrier plate 22 is thus suspended by means of the head 25 and associated elements from the upper plate 20, and the vertical plate extension 24 bears against the forward faces of the upper and lower plates 20 and 21 which are in the same vertical plane.

Conventional means are employed to raise and lower the carriage 17, including sprocket chains 27, arranged inwardly of the channels 13 and 14, and having their lower ends secured to horizontal lugs or webs 28, formed integrally upon the inner sides of the vertical members 18, near the longitudinal centers of the same. The sprocket chains 27 engage the usual sprocket wheels 29 near the top of the mast 11. The usual vertical hydraulic ram 30, arranged midway between the sides of the mast 11 has its upper end connected with a crosshead 31, upon which the rotatable sprocket wheels 29 are bodily mounted for vertical movement. The ends of the crosshead 31 are rigidly secured at 31' to the innermost channels 13, at their upper ends for raising and lowering the same relative to the outer channels 14 which are held against vertical movement by the support bearings 15. After passing over the sprocket wheels 29, the rear ends of the chains 27 are secured at 27' to a crossbar 28', in turn rigidly mounted upon the backs of the outer channels 14. This construction is also that of a conventional industrial lift-truck, and need not be described in further detail in connection with the present invention.

My loading and unloading means for the lift-truck comprises a rectangular accordion-pleated bellows 32, preferably formed of cord reinforced rubber, synthetic rubber or the like. The material of the bellows 32 is relatively heavy and tough, so as to render the bellows capable of withstanding substantial internal air pressure without bursting or leaking, and also to render the bellows quite stiff so that the same will tend to support itself in the open or extended horizontal position, Figures 1 and 4. The bellows 32 is preferably preformed or molded to provide any preferred number of relatively large accordion-type pleats or folds 33, as shown. The type of bellows which I contemplate using will retain its shape in the open or extended horizontal position without sagging or becoming deformed to any considerable extent.

A flat rectangular adapter plate 34 is arranged against the forward face of the vertical plate extension 24 and substantially covers the same. This adapter plate 34 is rigidly secured to the plate extension 24 by means of screws 35, engaging in screw-threaded openings formed in the vertical plate extension 24. The screws 35 also serve to tightly clamp an open rectangular clamping frame or plate 36 against an inturned marginal skirt or attaching portion 37 of the inner end of the bellows 32, which is disposed between the adapter plate 34 and clamping frame 36, as shown. This arrangement forms a gas-tight joint between the inner end of the bellows 32 and adapter plate 34. If desired, a liquid sealing compound or cement of any preferred type may be used in connection with the screws 35, clamping frame 36 and associated elements to render the connection between the inner end of the bellows and adapter plate 34 further gas-tight.

The forward end of the bellows 32 has an inturned continuous marginal skirt or attaching part 38, like the skirt 37, and a rectangular open clamping frame or plate 39 is arranged upon the inner side of the skirt 38 and receives screws 40 which extend through openings in a forward rigid head plate 41, and carry nuts 42 at their forward ends and forwardly of the head plate 41. A rectangular suction head or gasket 43 of medium soft rubber, synthetic rubber or the like has its continuous vertically disposed rectangular body portion 44 arranged between the bellows skirt 38 and a forwardly offset flat marginal flange 45 of the head plate 41. The screws 40 extend through openings formed in the body portion 44, which body portion together with the bellows skirt 38 is tightly clamped between the rigid flange 45 and clamping frame 39 by the screws 40 and nuts 42. This arrangement forms a gas-tight closure for the forward end of the bellows 32.

The suction head 43 further comprises a continuous rectangular forwardly projecting tapered lip 46, which extends a considerable distance forwardly of the flange 45 for engagement with the load L to be drawn onto the carrier plate 22. The lip 46 preferably tapers to a leading feathered or knife-like edge, as shown, and the lip 46 is quite flexible in the manner of a rubber suction cup so that it may spread itself outwardly upon contact with the flat face of the load L.

As shown in the drawings, the bellows 32 is extensible over the horizontal carrier plate 22 and retractable or foldable to lie against the adapter plate 34 in a substantially flat compact condition as shown clearly in Figures 3 and 6. A large elliptically coiled expansion spring 47 is arranged inside of the bellows 32 and has its rear end engaging the adapter plate 34 and its forward end engaging the head plate 41. This spring 47 is strong enough to maintain the bellows 32 normally extended as shown in Figures 1 and 4, with the leading edge of the lip 46 projecting slightly beyond the leading edge of the carrier plate 22 for engagement with the load L. When the bellows 32 is collapsed against the adapter plate 34, the spring 47 is compressed, and I prefer to form the coils of the spring 47 successively larger toward the rear end of the spring so that the coils will interfit as shown in Figure 6 and allow complete collapsing of the bellows 32.

The head plate 41 has a central opening 48 formed therein, and a thin boss 49 on the inner face of the head plate 41 constitutes an air-tight seat for a conventional hinged flap valve 50. A central opening 51 in the rear adapter plate 34 registers with a screw-threaded opening 52 formed centrally within the vertical plate extension 24. A screw-threaded nipple 53 engages within the screw-threaded opening 52, and an elbow 54 connected with the nipple 53 extends through the space between the upper and lower plates 20 and 21 of the carriage 17. Rearwardly of the plates 20 and 21, the elbow 54 is connected with a vertically extending flexible air hose 55, which extends upwardly between the sides of the mast 11 and between the sprocket chains 27, as shown. The air hose 55 is trained over a pulley 56 near the top of the mast 11 and arranged between the sprocket wheels 29, and journaled upon the crosshead 31 carrying the sprocket wheels. Rearwardly of the pulley 56, the air hose 55 extends downwardly adjacent to the rear side of the mast 11 and is connected with an elbow 57, spaced somewhat downwardly from the top of the mast and in turn rigidly secured to the fixed crossbar 28'.

At the crossbar 28', the elbow 57 is connected with a nipple or fitting 58, carried by an air hose 59 which extends downwardly along the mast 11, rearwardly thereof to the floor of the truck 10 as shown in the drawings. A conventional two-way air valve 60 is mounted upon the truck 10 in a convenient location for operation by the driver, and a discharge port of this valve is permanently connected with the hose 59. A receiver tank 61 for compressed air from a source not shown is mounted upon the truck near the valve 60, and connected with an adjustable port of the valve by a hose or line 62. A suction pump 63 is likewise mounted upon the truck near the valve 60 and also connected with the adjustable port of the valve by a hose or line 64. The arrangement is such, that operation of a control handle 65 of the valve 60 will effect a connection of either the compressed air tank 61 or suction pump 63 with the hose 59, for supplying either compressed air to or creating suction within the bellows 32.

In the operation of the lift-truck, the carriage 17 is elevated and lowered along the mast 10 in a conventional manner, by means of the hydraulic ram 30, chains 27 and associated elements. Since the crosshead 31 is bodily carried by the movable channels 13, the same causes elevation of the sprocket wheels 29 and pulley 56 when the ram 30 is extended. Since the rear ends of the chains 27 are secured at 27' to the fixed crossbar 28', elevation of the crosshead 31 will cause rotation of the sprocket wheels 29 and pulley 56, and the chains 27 will elevate the carriage 17, due to their attachment to the carriage at the webs 28. The flexible hose 55 will also be elevated by means of the pulley 56 as the carriage 17 is raised by extension of the mast.

The loading and unloading means for the truck operate as follows: With the valve 60 arranged in a neutral position so that neither compressed air nor suction is applied to the bellows 32, the bellows will normally remain extended or open as shown in Figures 1, 2 and 4 due to the action of the expansible coil spring 47. When so extended, the leading edge or lip 46 of the rubber suction head 43 preferably projects slightly forwardly of the leading edge 23 of the carrier plate 22. When the truck 10 is advanced toward the load L for picking up the same, the suction head 43 will contact the load L slightly in advance of the carrier plate 22 and the thin knife-like lip 46 of the suction head will spread and contact the side of the load in a continuous manner about the margin of the suction head 43. The spring 47 is strong enough to hold the suction head 43 in contact with the load L and effect the necessary spreading or fanning out of the lip 46 without collapsing the extended bellows 32.

When the suction head 43 is thus advanced against the load L, the control valve 60 is adjusted to place the suction pump 63 in communication with the hoses 59 and 55, and a partial vacuum will be created within the bellows 32. When this occurs, the inwardly opening flap valve 50 will be unseated and a partial vacuum will be created inwardly of the lip 46 and between the suction head 43 and load L. This partial vacuum will produce a strong grip action of the suction head 43 upon the load L, and a further increase in the amount of suction or vacuum in the bellows 32 will cause the bellows to collapse or close upon the flat adapter plate 34, as shown in Figure 3 for drawing the load L onto the carrier plate 22. The spring 47 is now compressed and will assume the flattened position shown in Figure 6, and the entire bellows assembly is disposed relatively flatly against the vertical adapter plate 34. The control valve 60 may now be adjusted to a neutral position, if desired, with the load L upon the carrier plate 22, and the load may be transported to the desired location in the warehouse or the like.

When it is desired to discharge the load L from the truck, it is merely necessary to adjust the valve 60 to the proper position for placing the compressed air receiver 61 in communication with the hose 59. When this is done, compressed air flows through the hoses 59 and 55 to the interior of the bellows 32, and the hinged flap valve 50 is immediately closed against the seat 49. The vacuum inside of the suction head lip 46 is now broken, and continued pressurizing of the bellows 32 causes the same to become extended for pushing the load L off of the carrier plate 22. The operator has direct control over the movement of the bellows 32 at all times by means of the valve 60, and the load L may readily be drawn onto or discharged from the carrier plate 22 at the will of the operator and without the aid of additional workmen.

Although I have illustrated schematically one preferred form of means for creating a vacuum in and pressurizing the bellows 32, it should be understood that any other conventional means desired may be employed.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In an industrial lift-truck, an elevatable carriage, a substantially horizontal load-receiving member secured to the carriage and projecting forwardly thereof, a bellows mounted upon the carriage above the substantially horizontal member and adapted to move horizontally above said member to extended and collapsed positions, a spring connected with the bellows to maintain the same normally extended, a suction head secured to the forward end of the bellows for engagement with a load to be drawn onto said member, and pneumatic means connected with the bellows and suction head for establishing a partial vacuum therein and thereby causing the bellows to collapse for drawing the load onto said load-receiving member.

2. An industrial lift truck comprising an upright mast including relatively stationary and elevatable sections, a lift carriage associated with the mast and being vertically movable with respect to said stationary and elevatable mast sections and having a substantially horizontal load-receiving part extending forwardly of the mast and carriage, a fluid pressure and suction operated extensible device connected with the carriage above said load-receiving part and adapted to draw a load onto said load-receiving part and to push the load therefrom, a pulley carried by said elevatable section of the mast, a stationary fluid pressure and suction connection secured to the relatively stationary mast section below the elevation of said pulley, and a flexible hose engaging said pulley and having one end connected with said connection and its other end connected with said extensible device and carriage.

3. In an industrial lift-truck, a vertically movable carriage, a substantially horizontal load-receiving member secured to the carriage and projecting forwardly thereof and having a leading edge, a bellows connected with the carriage above said substantially horizontal member and adapted to be shifted horizontally over said member to extended and collapsed positions, a suction head secured to the forward end of the bellows and extending forwardly of said leading edge of the member when the bellows is extended, a spring connected with the bellows for maintaining the same normally extended, a check valve between the suction head and bellows to be closed when pressure is applied to the interior of the bellows and opening when a partial vacuum is created within the bellows, and pneumatic means connected with the bellows for alternately applying pressure to and creating a partial vacuum within the same.

4. In an industrial lift-truck, an upright mast, a carriage connected with the mast and adapted to be raised and lowered, a substantially L-shaped load-receiving member connected with the carriage and having a substantially horizontal part provided with a leading edge, a hollow extensible and collapsible device connected with the L-shaped load-receiving member above said substantially horizontal part of the latter and adapted to sweep over the horizontal part of the load-receiving member in moving from a collapsed to an extended position, pneumatic means connected with the hollow extensible and collapsible device for alternately supplying pressure to and creating a partial vacuum in the same, a resilient suction head carried by the forward end of the extensible and collapsible device and adapted to extend forwardly of the leading edge of said horizontal part when the extensible and collapsible device is extended, check valve means between said resilient suction head and extensible and collapsible device, and resilient means connected with the extensible and collapsible device to normally maintain the same extended, said device collapsing against the inner end of said L-shaped load-receiving member and drawing the load onto the horizontal part of the same when said pneumatic means produces a partial vacuum within said extensible and collapsible device.

5. In an industrial truck, an upright mast, a carriage mounted upon the mast and adapted to be raised and lowered, a substantially L-shaped lifting member carried by the carriage and having a substantially vertical part and a substantially horizontal load-receiving part, a rectangular accordion-pleated bellows arranged above the substantially horizontal load-receiving part of the L-shaped lifting member and having one end secured to the substantially vertical part of the lifting member and its other end freely disposed, the bellows being extensible and retractable horizontally above said substantially horizontal load-receiving part, a resilient load-engaging head secured to said other freely disposed end of the bellows and having a tapered marginal lip adapted to spread outwardly upon contact with the load for gastight engagement therewith, a coil spring mounted within the bellows for normally holding the same extended with the tapered lip in advance of the leading end of said substantially horizontal load-receiving part, check valve means arranged between said resilient load-engaging head and bellows and adapted to open when a partial vacuum is created within the bellows for placing the interior of the bellows and head in communication, the check valve means closing when pressure is applied to the bellows for extending the same, a conduit connected with the end of the bellows adjacent to said substantially vertical part of the L-shaped lifting member, and pneumatic means connected with the conduit for creating a partial vacuum within and pressurizing the bellows to effect retraction and extension of the same.

6. In an industrial lift-truck, a substantially upright mast, a carriage connected with the mast and adapted to be raised and lowered, a substantially horizontal load-receiving member secured to the carriage for movement therewith and having a leading edge, a collapsible bellows device arranged above said load-receiving member and extensible and retractable over the same longitudinally, the rear end of said bellows device being secured to said carriage and the forward end of the bellows device being freely disposed, a spring connected with the bellows device to maintain the same normally extended with its forward end arranged near said leading edge, a suction head carried by the forward end of the bellows including a resilient marginal part projecting forwardly of said leading edge for engagement with an article to be drawn onto the load-receiving member, a check valve carried by the forward end of the bellows device and closed when the interior of the bellows device is pressurized and opening when a partial vacuum is created within the bellows device and thereby creating a partial vacuum within the suction head, and means connected with the rear end of the bellows device for alternately pressurizing the same and creating a partial vacuum therein, the bellows retracting toward the carriage and drawing the load onto said load-receiving member when a partial vacuum is created within the bellows device.

7. In an industrial lift-truck, an elevatable carriage, a substantially horizontal load-receiving member secured to the carriage for movement therewith, a bellows connected with the carriage above said load-receiving member and operable above said member to extended and collapsed positions, a suction head secured to the forward end of the bellows to engage the load to be drawn onto the member, a check valve between the suction head and bellows and closing when pressure is applied to the interior of the bellows and opening when suction is applied to the bellows, and pneumatic means connected with the bellows for alternately applying pressure and suction to the bellows.

References Cited in the file of this patent
UNITED STATES PATENTS

| | | |
|---|---|---|
| 1,089,274 | Von Sazenhofen | Mar. 3, 1914 |
| 1,996,385 | Owen | Apr. 2, 1935 |
| 2,547,329 | Lapham | Apr. 3, 1951 |
| 2,589,101 | Leguillon et al. | Mar. 11, 1952 |
| 2,610,824 | Grier | Sept. 16, 1952 |
| 2,619,241 | Jessen | Nov. 25, 1952 |
| 2,622,750 | Ehlers | Dec. 23, 1952 |